United States Patent
Wellig et al.

(10) Patent No.: US 12,355,754 B2
(45) Date of Patent: Jul. 8, 2025

(54) BUILDING MANAGEMENT SYSTEM ARCHITECTURE

(71) Applicant: Honeywell International Inc., Morris Plains, NJ (US)

(72) Inventors: Armin Wellig, Mont-sur-Rolle (CH); Manish Sharma, Alpharetta, GA (US); Adam Robert Gibson, Brunswick (AU); Ognjen Stanarevic, Le Mont-sur-Lausanne (CH)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 715 days.

(21) Appl. No.: 16/928,916

(22) Filed: Jul. 14, 2020

(65) Prior Publication Data
US 2022/0021667 A1    Jan. 20, 2022

(51) Int. Cl.
*H04L 9/40* (2022.01)
*G05B 13/02* (2006.01)
*G05B 15/02* (2006.01)
*G05B 19/02* (2006.01)
*G05B 19/042* (2006.01)
*H04L 9/08* (2006.01)
*H04L 9/32* (2006.01)
*H04L 67/55* (2022.01)

(52) U.S. Cl.
CPC .......... *H04L 63/0823* (2013.01); *G05B 13/02* (2013.01); *G05B 15/02* (2013.01); *G05B 19/02* (2013.01); *G05B 19/042* (2013.01); *H04L 9/088* (2013.01); *H04L 9/3263* (2013.01); *H04L 67/55* (2022.05); *G05B 2219/25011* (2013.01); *G05B 2219/2614* (2013.01)

(58) Field of Classification Search
CPC ......... H04L 67/55; G05B 13/02; G05B 15/02; G05B 19/02; G05B 19/042; G05B 2219/25011
See application file for complete search history.

(56) References Cited

U.S. PATENT DOCUMENTS 7,835,274 B2    11/2010    Chapman et al.
8,051,156 B1    11/2011    Sharma et al.
(Continued)

FOREIGN PATENT DOCUMENTS

EP    3869761 A1    8/2021
WO    2016003311 A1    1/2016

OTHER PUBLICATIONS

Eclipse Foundation ("Sparkplug™ MQTT Topic & Payload Specification Rev 2.2") (Year: 2019).*
(Continued)

*Primary Examiner* — Schyler S Sanks
(74) *Attorney, Agent, or Firm* — Seager, Tufte & Wickhem, LLP

(57) ABSTRACT

A building control device includes a controller for controlling one or more building control components, the controller configured to generate building control information and/or consume building control information. The building control device includes an MQTT component that is operatively coupled to the controller, the MQTT component for publishing outgoing building control information generated by the controller and/or subscribing to incoming building control information for consumption by the controller over an IP network. A MUD component is for use in advertising one or more specifications for the building control device on the IP network.

15 Claims, 6 Drawing Sheets

(56) References Cited

U.S. PATENT DOCUMENTS

| | | | |
|---|---|---|---|
| 9,077,544 | B2 | 7/2015 | Baker et al. |
| 9,317,688 | B2 | 4/2016 | Yegin et al. |
| 9,461,976 | B1 | 10/2016 | Smith et al. |
| 10,298,581 | B2 | 5/2019 | Shah et al. |
| 10,659,289 | B2 | 5/2020 | Shif et al. |
| 11,374,981 | B2 | 6/2022 | Lear et al. |
| 11,533,229 | B2 | 12/2022 | Vanderveen et al. |
| 11,582,601 | B2 | 2/2023 | Ganesan et al. |
| 2008/0147840 | A1 | 6/2008 | Roelens et al. |
| 2014/0041004 | A1 | 2/2014 | Stewart |
| 2015/0222621 | A1 | 8/2015 | Baum et al. |
| 2016/0323689 | A1 | 11/2016 | Goluboff |
| 2017/0041793 | A1 | 2/2017 | Lee et al. |
| 2017/0134688 | A1 | 5/2017 | Yoon et al. |
| 2017/0223011 | A1 | 8/2017 | Schultz et al. |
| 2017/0364046 | A1* | 12/2017 | Westrick, Jr. .......... G05B 15/02 |
| 2020/0145494 | A1* | 5/2020 | Buchstaller ............ H04L 67/10 |
| 2020/0162503 | A1 | 5/2020 | Shurtleff et al. |
| 2020/0177485 | A1* | 6/2020 | Shurtleff ................ H04L 67/12 |
| 2021/0367839 | A1 | 11/2021 | Vanderveen et al. |

OTHER PUBLICATIONS

Internet Engineering Task Force (IETF) (RfC: 8520, 2019) (Year: 2019).*

Bischoff (How to Secure Your IoT Devices With a VPN, 2018) (Year: 2018).*

HiveMQ (HiveMQ—MQTT Security Fundamentals, 2015) (Year: 2015).*

Virtual Private Networks: How They Work And Why You Might Need One, Apr. 27, 2018, Interesting Engineering, https://interestingengineering.com/culture/virtual-private-networks-how-they-work-and-why-you-might-need-one (Year: 2018).*

Muller et al., "Distributed Systems Laboratory HomeCA: Scalable Secure IoT Network Integration," (Year:2017).

Blackmer, "Scaling Security for the Internet of Things with MUD," 2016. (Year:2016).

Pritkin, "Bootstrapping Remote Secure Key Infractructures (BRSKI)" Mar. 13, 2017. (Year:2017).

Lear, "Manufacturer Usage Description Specification," Mar. 8, 2017. (Year:2017).

Watsen, "Voucher Profile for Bootstrapping Protocols," Mar. 15, 2017 (Year:2017).

Lear et al., "Manufacturer Usage Description Specification," Network Working Group Internet Draft, <draft-lear-ietf-netmod-mud-04>, Aug. 1, 2016, 26 Pages, Internet Engineering Task Force Trust.

Pritikin et al., "Bootstrapping Remote Secure Key Infrastructures (BRSKI)" ANIMA WG Internet Draft, <draft-ietf-anima-bootstrapping-keyinfr-30>, Jun. 30, 2016, 46 Pages, Internet Engineering Task Force Trust.

* cited by examiner

BUILDING MANAGEMENT SYSTEM ARCHITECTURE

TECHNICAL FIELD

The present disclosure relates generally to building management systems, and more particularly to an architecture useful in building management systems.

BACKGROUND

Building management systems are commonly used to control one or more functions of a building. For example, a Heating, Ventilation and/or Air Conditioning (HVAC) system may control the heating and cooling needs of the building. A security system may provide a security function to the building. A lighting system may provide a lighting control function to the building. A fire system may provide a fire alarm and/or fire suppression function to the building. A chemical detection system may provide a chemical detection and warning function to the building. An e-meter system may provide a meter reading function to the building. These are just examples. Some or all of these building control devices may be supplied by a different vendor, and may communicate using different communication protocols and/or over different networks. This can make it difficult to commission and/or service the building management system. It can also make it difficult to share information between the various building control devices in an efficient way and/or standardize on a particular hardware platform, which could minimize costs in providing bundles across verticals based on a common architecture framework.

SUMMARY

The present disclosure relates generally to building management systems, and more particularly to an architecture that that facilitates commissioning of various building control devices and communication between the various building control devices. In some cases, this is accomplished by facilitating a convergence of the building control devices, sometimes referred to as Operation Technology (OT), with Information Technology (IT) on an IT network of the building. In some cases, some or all of the building control devices become addressable on the IT network of the building. To enhance security, some or all of the building control devices (OT) may store one or more network policies that, when the building control devices are exposed to the IT network, are advertised on the IT network and define an intended purpose. The network policies may automatically create secure virtual private networks on the IT network that only allow communication between devices that have a common intended purpose. In some cases, one or more of the building control devices may be implemented using one or more virtualized containers loaded on IT hardware connected to the IT network, but this is not required.

In one particular example, a building control device includes a controller for controlling one or more building control components, the controller configured to generate building control information and/or consume building control information. The building control device includes an MQ Telemetry Transport (MQTT) component that is operatively coupled to the controller, the MQTT component for publishing outgoing building control information generated by the controller and/or subscribing to incoming building control information for consumption by the controller over an IP network. A Device Advertisement Specification includes a set of policies that define what a particular device can do, what can be configured, what can be remote controlled (e.g. MQTT Sparkplug birth certificate) and what its networking intent is (Manufacturer Usage Description (MUD)).

In another example, a building control device includes a controller for controlling one or more building control components, the controller configured to generate building control information and/or consume building control information. A message publisher-subscriber component (e.g. MQTT) is operatively coupled to the controller, the message publisher-subscriber component for publishing outgoing building control information generated by the controller and/or subscribing to incoming building control information for consumption by the controller over an IP network. A network connection definition component (e.g. MUD) is for use in advertising one or more network intentions of the building control device on the IP network.

In another example, a method provides for connecting a building control device to an IP network. One or more network intentions of the building control device are advertised on the IP network. A virtual private network is established over the IP network based at least in part on one or more of the network intentions. Outgoing building control information generated by the building control device is published and/or incoming building control information for consumption by the building control device is subscribed to over the virtual private network established on the IP network.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
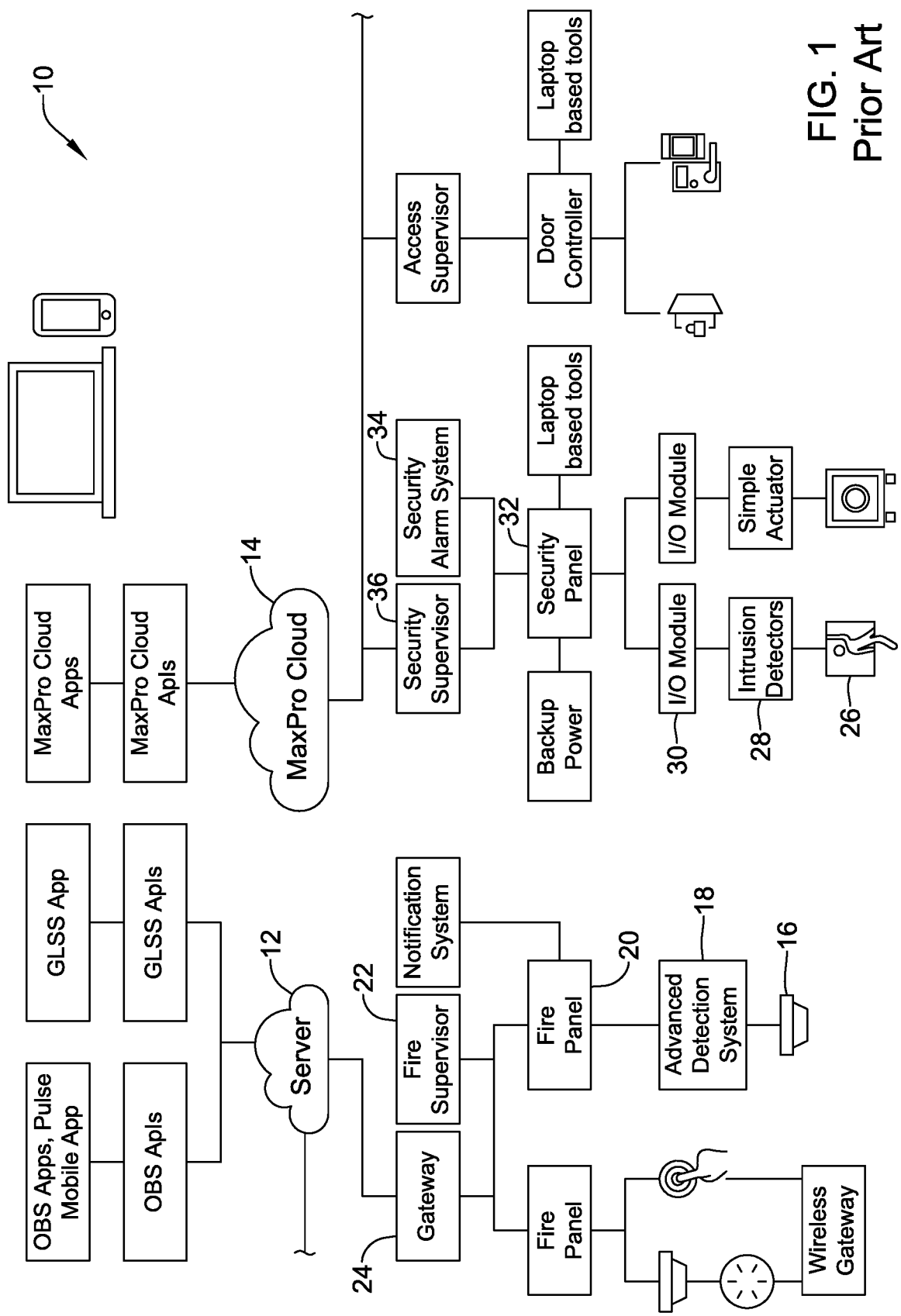
FIG. 1 is a schematic block diagram showing a prior art building management system architecture.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of a prior art building management system architecture 10 showing how a variety of different devices are ultimately connected within the architecture 10. As can be seen in FIG. 1, the architecture 10 is complicated, with a number of different components between any particular device and a cloud-based server 12. Indeed, some of the components are even operably coupled to a different cloud-based server 14. Some components, dependent on type, ultimately communicate with the cloud-based server 12 and others ultimately communicate with the cloud-based server 14.

As an example, look at a fire detection device 16. The fire detection device 16 communicates with an Advanced Detection System block 18, which itself communicates with a Fire Panel 20. The Fire Panel 20 communicates with a Fire Supervisor 22 as well as a Gateway 24. The fire detection device 16 ultimately communicates with the cloud-based server 12 through the Gateway 24. As another example, look at an intrusion sensor 26. The intrusion sensor 26 communicates with an Intrusion Detections block 28, which communicates with an I/O module 30. The I/O module 30 communicates with a Security Panel 32. The Security Panel 32 communicates with a Security Alarm System 34 and a Security Supervisor 36 before ultimately communicating with the cloud-based server 14. As can be seen, the prior art building management system architecture 10 may result in multiple levels of hierarchy. In some cases, the communication protocols used at various level can vary depending on the equipment used. In some cases, this can result in a fragmented building management system, such as that shown in FIG. 1.

Figure 2:
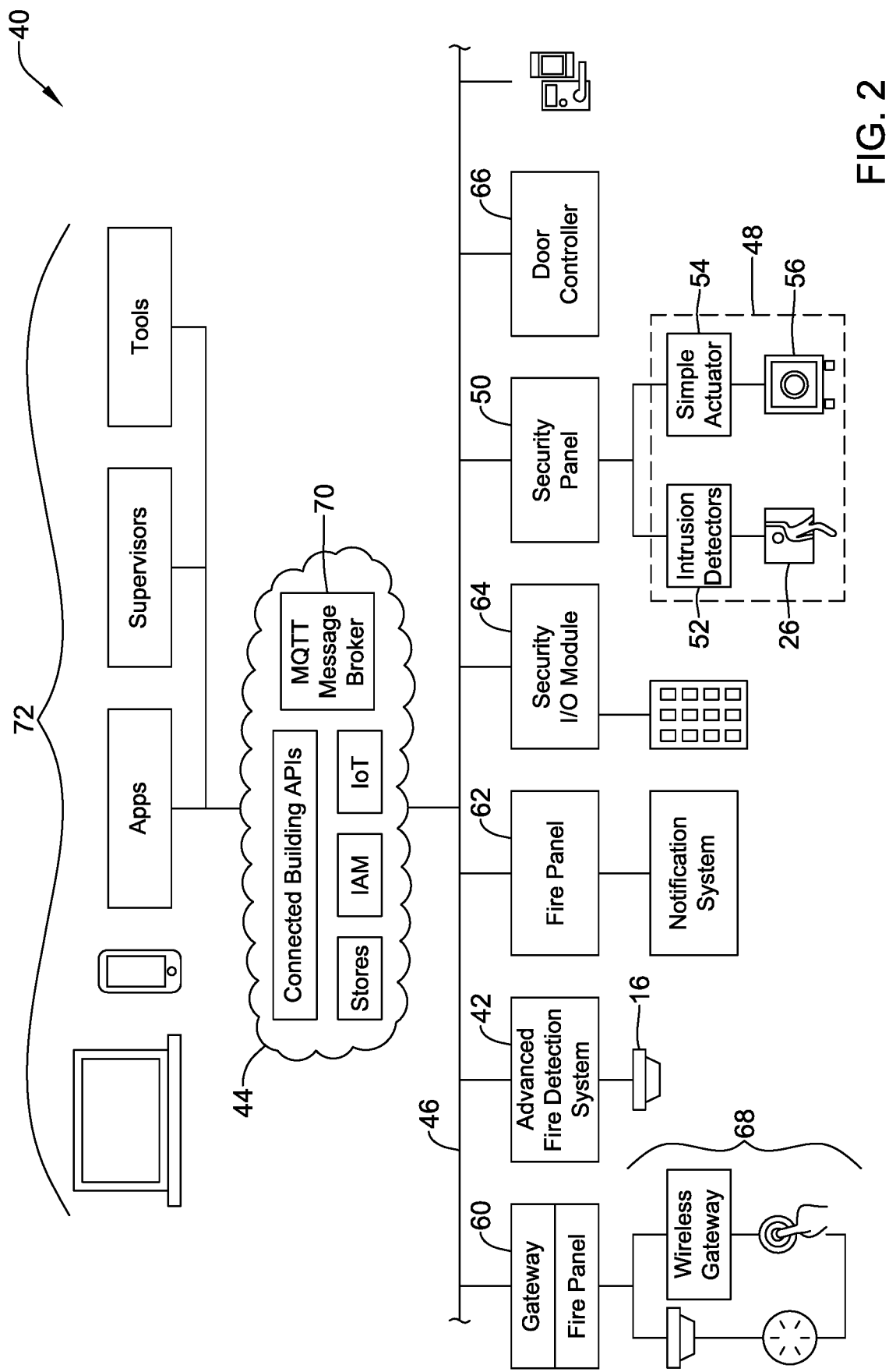
FIG. 2 is a schematic block diagram showing an illustrative building management system architecture of the present disclosure.

FIG. 2 is a schematic block diagram of an illustrative building management system architecture 40 in which a number of devices are operably coupled with an IP network 46. It will be appreciated that the architecture 40 is considerably flattened and simplified relative to the architecture 10 shown in FIG. 1. This can be illustrated with respect to the fire detection device 16 and the intrusion sensor 26 that were introduced in FIG. 1. In FIG. 2, it can be seen that the fire detection device 16 communicates with an Advanced Fire Detection System 42 that communicates directly with a cloud-based server 44 via an IP network 46. The intrusion sensor 26 is part of an intrusion sub-system 48 that communicates with a Security Panel 50 that itself communicates directly with the cloud-based server 44 via the same IP network 46. The IP network 46 may be an IT network of the building that may also support IT network traffic, such as network traffic to/from desktop computers, lap top computers, tablet computers, printers, wireless access points, routers, gateways and/or any other IT devices.

In some cases, the intrusion sub-system 48 includes as an Intrusion Detection block 52 coupled with the intrusion sensor 26. The intrusion sub-system 48 may include a Simple Actuator block 54 that communicates with a sensor 56. While the components within the intrusion sub-system 48 may be considered as being devices that are not directly addressable, in some instances each of these devices can be considered as having an IP address on the IP network 46 through a MQTT Sparkplug client running on the security panel 50. Accordingly, from the perspective of the IP network 46 (e.g. the cloud-based server 44), each of the devices within the intrusion sub-system 48 can effectively be individually addressed on the IP network 46, levering a common MQTT topic namespace, thereby abstracting the underlying hardware and subsystem network details. It will be appreciated, from looking at these two examples of the fire detection device 16 and the intrusion sensor 26, that the illustrative architecture 40 provides an elegant solution for connecting a variety of different components, some having varying installation dates and manufacturers, to an IP network such as the IP network 46.

The architecture 40 includes other components as well. It will be appreciated that what is shown is likely a small fraction of the components that could and likely would be included in the architecture 40. The illustrative architecture 40 includes a Gateway/Fire Panel 60, a Fire Panel 62, a Security I/O module 64 and a Door Controller 66, each of which are directly coupled to the cloud-based server 44 via the IP network 46, and each of which are coupled to one or more OT devices beneath them. As an example, the Gateway/Fire Panel 60 is connected to a collection 68 of components.

The cloud-based server 44 may include a number of different function blocks. In some cases, as shown, the cloud-based server 44 may include an MQTT Message Broker block 70. The cloud-based server 44 may itself communicate with a supervisory level 72, which may allow easy access to information provided from each of the components to the cloud-based server 44. In some cases, as will be discussed, each of the devices within the architecture 40 that is connected to the IP network 46 may be configured to include a birth certificate that identifies the device and the available functions of the device. Each of the devices within the architecture 40 that is connected to the IP network 46 may be configured to include a MUD (Manufacturer Usage Description) certificate that identifies the networking intent of the device. For example, if a particular device is a smart light bulb, that device only needs to communicate with a lighting controller. The smart light bulb does not need to communicate with a fire system or an HVAC system, for example. The MUD certificates define this relationship. The MUD certificates can be considered as providing enhanced security to communication between devices by only allowing appropriate and desired communication.

Figure 3:
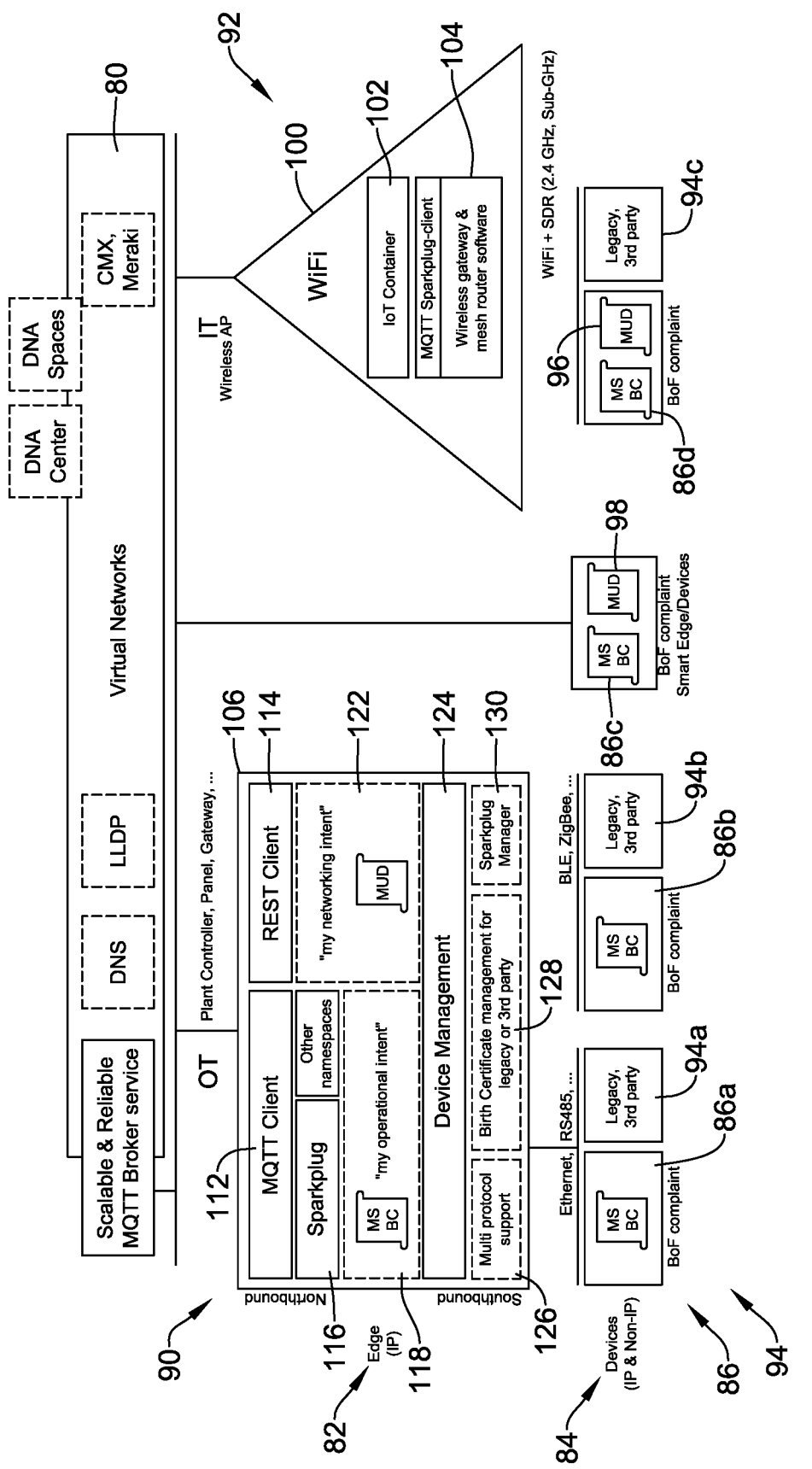
FIG. 3 is a schematic block diagram showing how OT devices and IT devices communicate within the illustrative building management system architecture of FIG. 2.

FIG. 3 is a schematic block diagram showing the interplay between OT (Operational Technology) components and IT (Information Technology) components in an illustrative architecture. In some ways, it is appropriate to think about this in terms of OT components becoming IT citizens as a result of the MUD certificates that each of the OT devices have, and IT components becoming OT citizens through the use of birth certificates and MQTT Sparkplug. FIG. 3 shows virtual networks 80 that may be created on an IP network, such as IP network 46 of FIG. 2. The virtual networks 80 may be implemented using any desired configuration. In some cases, the virtual networks 80 may be implemented on a CISCO™ system, but this is not required. FIG. 3 includes an Edge level 82 and a Devices level 84. The Edge level 82 and the Devices level 84 may each be considered as being divided into an OT side 90 and an IT side 92. It can be seen that some of the devices at the Devices level 84 includes a Birth Certificate (BC) 86, individually labeled as 86a, 86b, 86c, 86d. In some cases, there may be one or more legacy third party devices 94, individually labeled as 94a, 94b, 94c, that do not include a BC 86.

For the devices on the IT side 92, some of the devices also includes a MUD certificate 96. In some cases, there may be one or more legacy third party devices 94c that do not include a BC 86 or a MUD certificate. Some devices communicate directly with one or more of the virtual networks 80, and may include both a BC 84c and a MUD certificate 98. On the IT side 92, some of the devices on the Devices level 84 may communicate with an Edge device 100. In some cases, the Edge device 100 may include multi-protocol support, which may enable legacy, new and third party devices at the Devices level 84 to connect to the Edge device 100 via different connectivity options and protocols. In the example shown, the Edge device 100 communicates with one or more of the virtual networks 80 on the IP network 46. In some cases, the Edge device 100 also includes an MQTT Sparkplug client 104 that publishes and/or subscribe to building control information via one or more of the virtual networks 80. The particular virtual network 80 is identified by the corresponding MUD certificate. This arrangement may facilitate the Edge device 100 to provide appropriate communication between each of the devices at the Devices level 84 and the appropriate virtual networks 80. In some cases, the Edge device 100 is implemented using one or more virtual containers 102. The one or more virtual containers 102 may be considered as being executable software packages, sometimes running on standard IT hardware.

Back on the OT side 90, the Edge level 82 includes an illustrative controller 106 that is functionally divided into a northbound portion 108 and a southbound portion 110. The northbound portion 108 handles communication with the virtual network(s) over IP 80 while the southbound portion 110 handles communication with the devices at the Devices level 84 (which is typically based on non-IP protocols and network topologies including wireless). It will be appreciated that there may be multiple types of devices. Accordingly, the northbound portion 108 may include both an MQTT client 112 and one or more other clients 114. The one or more other clients 114 may be any of a variety of different clients, depending on the particular needs of the system. For example, MQTT Sparkplug client is typically used to manage device advertisement and commissioning, while legacy application protocols such as BACnet may be used to operate building control strategies once the system is operational. Both protocol clients may run on the same IP network fabric.

On the MQTT client side, the northbound portion 108 may include an MQTT Sparkplug block 116 and an Operational Intent block 118 that interprets both the birth certificates and the MUD certificates of the devices down in the Devices level 84. In some cases, the one or more other client side may include only a Network Intent block 122 that interprets the MUD certificates of devices down in the Devices level 84.

The illustrative southbound portion 110 includes a Device Management block 124, a Multi-Protocol Support block 126, a Birth Certificate Management block 128 and a Sparkplug Manager block 130. Each of these blocks 124, 126, 128, 130 enable the controller 106 to communicate with each of the devices in the Devices level 84. This communication can include two-way communication in which operational data flows upward (northbound) and control commands and other instructions flow downward (southbound). The Device Management block 124 may be understood as an abstraction layer of the associated device subsystem and allows addressing each device within that subsystem through the common MQTT topic namespace over the IP network.

In some cases, the illustrative architecture shown in FIGS. 2 and 3 can minimize equipment costs by leveraging physical assets such as cables, switches, gateways and the like across a variety of systems including BMS (Building Management Systems), Fire and Security and IT services. IT-OT conversion can aid in this. Using this architecture, installing and commissioning BMS/Fire/Security systems can be as easy as connecting a laptop to the IT network (e.g. plug and play). This can be enabled via IT-OT conversion and the use of birth certificates. Improved cyber security can be implemented by the use of MUD certificates. Even though everything may be communicating over the same IP network, as indicated above, MUD certificates can be used to establish secure virtual private networks on the IP network that only allow appropriate devices to communicate with one another. Through the use of MQTT sparkplug and IT-OT conversions, the controller 106 makes the devices on the Devices level 84 addressable on the IP network through the MQTT topic namespace, with each edge device associated with the subsystem device having an assigned IP address on the IP network.

Having IP addressable devices provides increased flexibility for application programming, closed-loop controls and sensor fusion by allowing well-established WEB technologies and concepts to provide a seamless user experience and incrementally develop or customize new use cases. This also simplifies the verticalization of building offerings including healthy building offerings. Because everything is running on the same network fabric, a holistic view of the health of all connected equipment (both BMS/Fire/Security and IT) and the health of the wired and wireless networks may be realized.

The building management system architecture described herein embraces a Publish-Subscribe message pattern, as opposed to the classical request-reply pattern that is implemented in client-server architectures in which the client regularly polls the server to check for data updates. Publishers, which send messages, do not program the messages to be sent directly to specific receivers, called Subscribers. Rather, the Publishers categorizes published messages into topics without knowledge of which Subscribers, if any, there may be. Similarly, Subscribers express interest in one or more topics and only receive messages that are of interest, without knowledge of which Publishers, if any, there are. This can provide greater network scalability and a more dynamic network topology.

In some cases, an implementation of a topic-based system is known as MQTT (Message Queueing Telemetry Transport). Message are published to "topics or named logical channels. The Subscribers in a topic-based system will receive all messages that are published to the topics to which they subscribe, with the Publisher being responsible for defining the topics to which the Subscribers can subscribe. A Publisher and/or a Subscriber may each be an IP-addressable device, service or client application. MQTT Sparkplug can be understood as being a thin application layer that runs on top of the MQTT specification and that has been optimized for Supervisory Control And Data Acquisition (SCADA) solutions by defining both an MQTT topic namespace convention and enforcing MQTT state management by including birth certificates. MUD (Manufacturer Usage Description) is an embedded software standard that is defined by the Internet Engineering Task Force (IETF) that allows IoT Device makers to advertise device specifications, including the intended communication patterns for their device when it connects to the network. The network can then use this intent to author a context-specific access policy, so the device functions only within those parameters. In this manner, MUD becomes the authoritative identifier and enforcer of policy for devices on the network.

The OT Edge may include IP-addressable devices like controllers, smart TO, security panels and the like. Devices may implement virtual containerized software components; that is, the actual controller software would also be able to run on IT hardware provided that the IT hardware would have all of the connectivity and Input/Outputs required to perform the OT task, thus moving toward IT-OT virtualization. For northbound capability, an MQTT client may be implemented to connect to an MQTT message broker 70 (see FIG. 2), including a Sparkplug client variant. As each device is connected during commissioning/power-up, its birth certificate may be sent to the MQTT broker and may exchange Sparkplug topic namespaces. The MQTT broker may function as the primary IoT messaging/event service. However, in some cases, the MQTT client may support other namespaces as well so that it can subscribe potentially to third party (or legacy) topics if needed, running on the same MQTT broker or different ones (at a different IP address). A REpresentational State Transfer (REST) client 114 may be implemented if required to send the MUD URL and get the access policies from the MUD File server.

For southbound capability, multi-protocol support 126 enables legacy, new and third party devices to connect via different connectivity options and protocols (e.g. via BACNET, MODBUS, REST, etc.). Topic namespaces may be constructed in such a way that the devices at the Devices level 84 appear to the consumer (the Subscriber) as if they are actually IP-addressable. For example, a commission app may talk to a sensor at the Devices level 84 connected through Bluetooth to a room controller (edge controller 106) by subscribing/publishing to the following topic: spBv1.0/hbt/DCMD/roomCtrl1/bleSensor1 . . . . A corresponding command would be received over IP network by the roomCtrl1 (edge controller 106) and then transmitted over Bluetooth to the bleSensor1.

MQTT birth certificates of legacy or third party devices are sent out as soon as a third party devices (e.g. sensor) is connected to the edge devices (e.g. edge controller 106) so that a BMS supervisor can see that a new device connected to the MQTT Sparkplug namespace. The BMS supervisor, when provided, may listen/subscribe to all topics so any changes will be captured in real-time.

OT devices may include legacy and third party devices that are not compliant with the architecture described herein. A birth certificate may be created by an edge node (e.g. edge controller 106) and may be part of the installation and commissioning process of the non-compliant OT devices. In some cases, a Birth Certificate Management module 128 may create a "device twin" representation (e.g. uploaded or defined during the subsystem installation and commissioning) or may implement a discovery algorithm that automatically populates a Birth certificate template for the legacy and third party device. New devices that are compliant with the architecture described herein may include a pre-defined birth certificate stored therein.

In some cases, the edge controller 106 may be implemented on IT equipment that includes virtual containers that provide some or all of the functionality of the edge controller 106. The IT equipment may by, for example, a Wireless Access Points or switch. For example, an OT sensor may be connected through ZigBee to a Wireless Access Point. A virtual container may be loaded on the Wireless Access Point that implements an MQTT sparkplug client that translates the OT sensor into the MQTT topic namespace following the same conventions as described with respect to the edge controller 106. The data from a particular Zigbee sensor may, for example, be published under the topic spBv1.0/hbt/DDATA/wirelessAP1/zigbeeSensor1, and any client application that subscribed to that topic (supervisor, app or room controller) would then receive any data/events published to this topic, e.g. in a BMS control loop. This closes the loop, as an OT sensor connects to an IT gateway to push data to an OT message broker (e.g. MQTT message broker 70), and the data is then consumed by an OT client. This reflects an IT-OT conversion operated by a single IP network fabric.

In some cases, there may ultimately be a conversion as well at the BMS supervisory level for part of the IT and OT functionality, as the commissioning steps such as design, provision, policy and assurance are fairly similar. Given that each OT edge node (and associated device) is sending a birth certificate upon initial connection (or as per request), a provision view can easily be populated automatically. Since the birth certificate contains all the details about the devices capabilities, efficient commissioning can be accomplished. In some cases, some or all of the commissioning may be scripted/automated.

Figure 4:
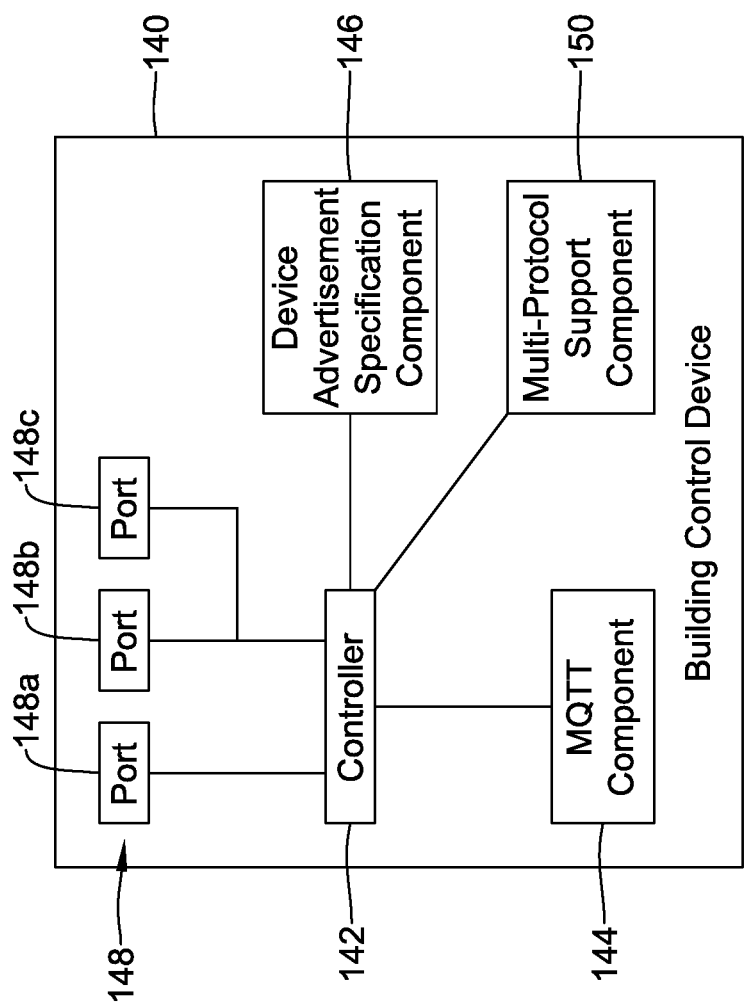
FIG. 4 is a schematic block diagram showing an illustrative building control device usable in the illustrative building management system architecture of FIG. 2.

FIG. 4 is a schematic block diagram of an illustrative building control device 140. This may be a representation of edge controller 106. The illustrative building control device 140 includes a controller 142 that is configured to control one or more building components. The controller 142 may be configured to generate building control information and/or to consume building control information. An MQTT component 144 is operatively coupled to the controller 142 and is configured for publishing outgoing building control information generated by the controller 142 and/or subscribing to incoming building control information for consumption by the controller 142 over an IP network such as the IP network 46 (FIG. 2). The IP network 46 may, for example, be an IT network that is configured to support IT network functionality. In some cases, the building control device may advertise one or more birth certificate on the IP network 46 that define corresponding device capabilities and configurable parameters. The birth certificate may be advertised whenever the corresponding device comes online or per request by a commissioning application and/or a BMS supervisor.

A MUD component 146 is operatively coupled to the controller 142 and is configured for use in advertising one or more specifications for the building control device 140 on the IP network 46. The one or more specifications that are advertised by the MUD component 146 may, for example, define a virtual private network (such as the virtual network 80) to be operated on the IP network 46. The MUD component 146 may store an encryption key to support the virtual private network, for example. In some cases, the MUD component 146 may be configured to ensure that the building control device 140 communicates over a secure virtual private network established over the IP network 46.

In some cases, the MQTT component 144 may publish outgoing building control information generated by the controller 142 to an MQTT broker over the IP network 46. The MQTT component 144 may include an MQTT sparkplug component. In some cases, the MQTT component 144 may publish outgoing building control information generated by the controller 142 to an MQTT broker (such as the MQTT Message Broker 70) over the IP network 46 and may subscribe to incoming building control information from the MQTT broker over the IP network 46. The MQTT component 144 may subscribe to incoming building control information from an MQTT broker over the IP network 46. The MQTT component 144 may send an MQTT birth certificate that defines the building control information that is available to be published by the MQTT component.

In some instances, the building control device 140 includes several ports 148, individually labeled as ports 148a, 148b, 148c. While a total of three ports 148 are shown, it will be appreciated that this is merely illustrative, as in some cases the building control device 140 may include any number of ports. One of the ports 148 may include a first port for connecting to the IP network 46 and one or more other ports for connecting to one or more devices at the Devices level 84. The building control device 140 may include a multi-protocol support component 150 for supporting communication with the one or more devices over a variety of different e communication protocols (IP, BACNET, MODBUS, REST, WiFi, Zigbee, etc.).

Figure 5:
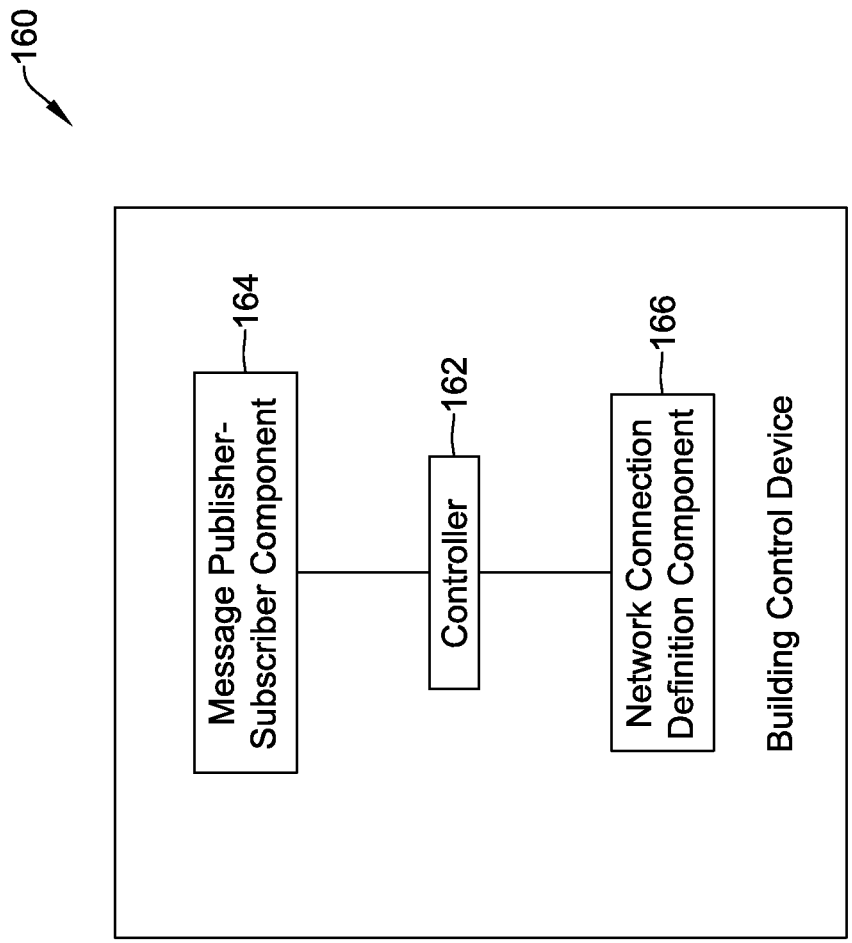
FIG. 5 is a schematic block diagram showing an illustrative building control device usable in the illustrative building management system architecture of FIG. 2.

FIG. 5 is a schematic block diagram of an illustrative building control device 160. The illustrative building control device 160 may share functionality ascribed to the building control device 140, and vice versa. The illustrative building control device 160 includes a controller 162 for controlling one or more building control components, the controller 162 being configured to generate building control information and/or consume building control information. A message publisher-subscriber component 164 is operatively coupled to the controller 162 and is configured for publishing outgoing building control information generated by the controller 162 and/or subscribing to incoming building control information for consumption by the controller 162 over the IP network 46. A network connection definition component 166 is configured for use in advertising one or more network intentions of the building control device 160 on the IP network 46.

In some instances, the one or more network intentions that are advertised by the network connection definition component 166 may define a virtual private network to be operated on the IP network 46. The network connection definition component 166 may store an encryption key to support the virtual private network. The IP network may be an IT network configured to support IT network functions. The network connection definition component 166 may be configured to ensure that the building control device communicates over a secure virtual private network established over the IP network. In some cases, message publisher-subscriber component 164 can receive incoming building control information from a wireless device that is wirelessly connected to the IP network.

Figure 6:
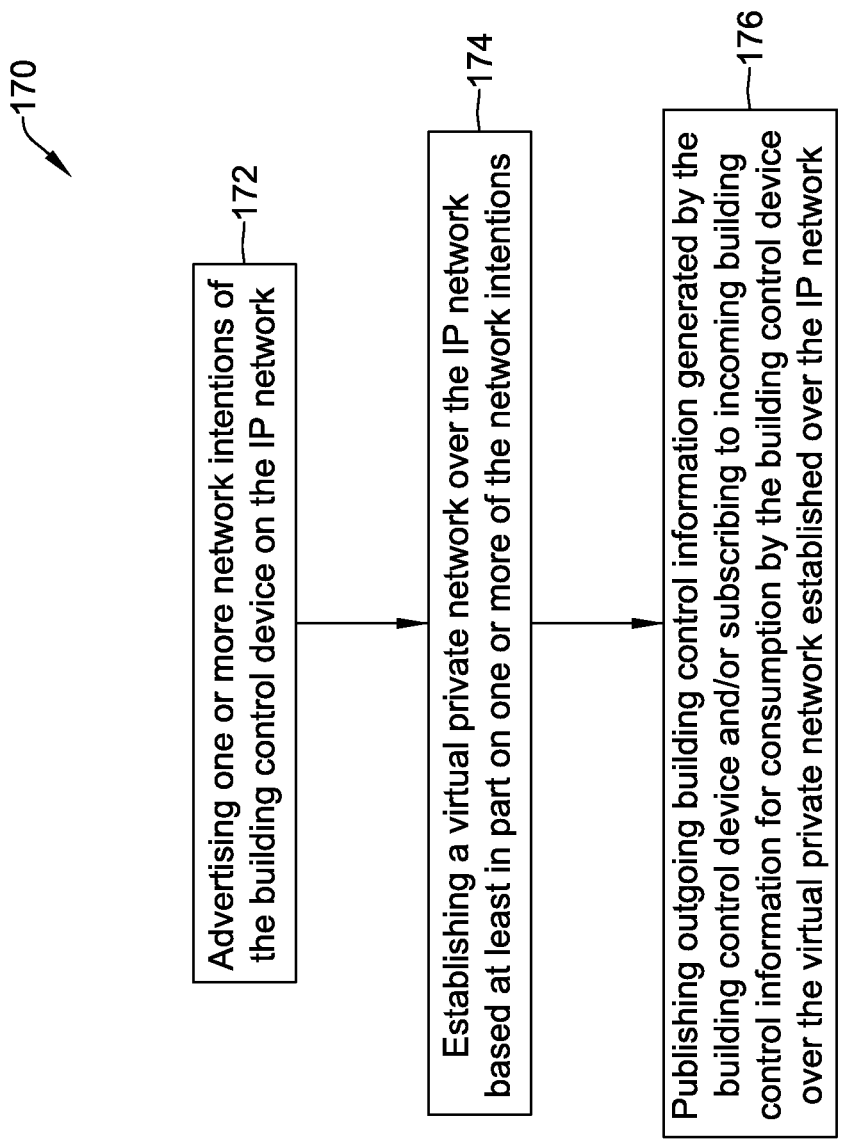
FIG. 6 is a flow diagram showing an illustrative method of connecting a building control device to an IP network.

FIG. 6 is a flow diagram showing an illustrative method 170 for connecting a building control device (such as the building control device 140 or the building control device 160) to an IP network (such as the IP network 46). One or more network intentions of the building control device are advertised on the IP network, as indicated at block 172. A virtual private network is established over the IP network based at least in part on one or more of the network intentions, as indicated at block 174. Outgoing building control information generated by the building control device is published and/or incoming building control information for consumption by the building control device is subscribed to over the virtual private network established over the IP network. In some cases, the outgoing building control information, when published, may be published to a message broker that is on the virtual private network. Incoming building control information, when subscribed to, may be received from a message broker that is on the virtual private network.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A building control device comprising:
a controller for controlling one or more Operational Technology (OT) building control components via a secure OT virtual private network that operates on an Information Technology (IT) Internet Protocol (IP) network, the controller configured to generate building control information and/or consume building control information;
a message publisher-subscriber component operatively coupled to the controller, the message publisher-subscriber component for publishing outgoing building control information generated by the controller to the secure OT virtual private network that operates on an Information Technology (IT) Internet Protocol (IP) network and/or subscribing to incoming building control information from the secure OT virtual private network that operates on the Information Technology (IT) Internet Protocol (IP) network for consumption by the controller, wherein the Information Technology (IT) Internet Protocol (IP) network supports IT network traffic that is outside of the secure OT virtual private network including IT network traffic between one or more desktop computers, lap top computers, tablet computers, printers, wireless access points, routers and/or gateways;
a Device Advertisement Specification component that includes a MUD component for use in advertising one or more specifications for the building control device on the secure OT virtual private network that operates on the Information Technology (IT) Internet Protocol (IP) network, wherein the MUD component stores an OT encryption key that provisions the building control device for secure communication over the secure OT virtual private network with one or more remote OT building control components that each store a respective MUD component that stores the OT encryption key that provisions the respective building control component for secure communication over the secure OT virtual private network; and
wherein the message publisher-subscriber component comprises a message publisher-subscriber client running on the building control device that translates OT data, generated by one or more of the OT building control components that do not include a MUD component that provisions the corresponding OT building control component for secure communication over the secure OT virtual private network, into a namespace convention of the message publisher-subscriber component of the building control device for publishing the OT data generated by the one or more of the OT building control components that do not include a MUD component that provisions the corresponding OT building control component for secure communication over the secure OT virtual private network onto the secure OT virtual private network that operates on the Information Technology (IT) Internet Protocol (IP) network.

2. The building control device of claim 1, wherein the message publisher-subscriber component publishes outgoing building control information generated by the controller to a message publisher-subscriber broker that resides outside of the building control device over the secure OT virtual private network that operates on the Information Technology (IT) Internet Protocol (IP) network.

3. The building control device of claim 1, wherein the message publisher-subscriber component subscribes to incoming building control information from a message publisher-subscriber broker that resides outside of the building control device over the secure OT virtual private network that operates on the Information Technology (IT) Internet Protocol (IP) network.

4. The building control device of claim 1, wherein the message publisher-subscriber component publishes outgoing building control information generated by the controller to a message publisher-subscriber broker that resides outside of the building control device over the secure OT virtual private network that operates on the Internet Protocol (IP) network and subscribes to incoming building control information from the message publisher-subscriber broker over the secure OT virtual private network that operates on the Information Technology (IT) Internet Protocol (IP) network.

5. The building control device of claim 1, wherein the message publisher-subscriber component sends a birth certificate that defines the building control information that is available to be published by the message publisher-subscriber component.

6. The building control device of claim 1, wherein the one or more specifications advertised by the MUD component identify the secure OT virtual private network that operates on the Information Technology (IT) Internet Protocol (IP) network.

7. The building control device of claim 1, further comprising:
a first port for connecting to the Internet Protocol (IP) network;
one or more other ports for connecting to the one or more OT building control components that do not include a MUD component that provisions the corresponding OT building control component for secure communication over the secure OT virtual private network; and
a multi-protocol support component operatively coupled to the one or more other ports for supporting communication over a plurality of different communication protocols with the one or more OT building control components that do not include a MUD component that provisions the corresponding building control device for secure communication over the secure OT virtual private network.

8. The building control device of claim 1, wherein the Information Technology (IT) Internet Protocol (IP) network is configured to support Information Technology (IT) Internet Protocol (IP) network functions.

9. A building control device comprising:
a first port for connecting to an Information Technology (IT) Internet Protocol (IP) network;
a controller for controlling one or more Operational Technology (OT) building control components via a secure OT virtual private network that operates on the Information Technology (IT) Internet Protocol (IP) network, the controller configured to generate building control information and/or consume building control information;
a message publisher-subscriber component operatively coupled to the controller, the message publisher-subscriber component for publishing outgoing building control information generated by the controller to the secure OT virtual private network that operates on an Information Technology (IT) Internet Protocol (IP) network and/or subscribing to incoming building control information from the secure OT virtual private network that operates on the Information Technology (IT) Internet Protocol (IP) network for consumption by the controller wherein the Information Technology (IT) Internet Protocol (IP) network supports IT network traffic that is outside of the secure OT virtual private network including IT network traffic between one or more desktop computers, lap top computers, tablet computers, printers, wireless access points, routers and/or gateways;
a network connection definition component for use in advertising one or more network intentions of the building control device on the secure OT virtual network that operates on the Information Technology (IT) Internet Protocol (IP) network to identify the secure OT virtual private network that is used by the message publisher-subscriber component of the building control device, wherein the network connection definition component stores an OT encryption key that provisions the building control device for secure communication over the secure OT virtual private network with one or more remote OT building control components that each store a respective network connection definition component that includes the OT encryption key that provisions the respective building control component for secure communication over the secure OT virtual private network; and one or more other ports for connecting to one or more OT building control components that do not include a network connection definition component that provisions the corresponding OT building control component for secure communication over the secure OT virtual private network; and a multi-protocol support component operatively coupled to the one or more other ports for supporting communication using a plurality of different communication protocols with the one or more OT building control components that do not include a network connection definition component that provisions the corresponding building control device for secure communication over the secure OT virtual private network.

10. The building control device of claim 9, wherein the one or more network intentions advertised by the network connection definition component are used to identify the secure OT virtual private network that is to be operated on the Information Technology (IT) Internet Protocol (IP) network.

11. The building control device of claim 9, wherein the Information Technology (IT) Internet Protocol (IP) network is configured to support Information Technology (IT) network functions.

12. The building control device of claim 9, wherein the message publisher-subscriber component can receive incoming building control information from a wireless device that is wirelessly connected to the secure OT virtual private network that operates on the Information Technology (IT) Internet Protocol (IP) network.

13. A method for connecting a building control device to an Information Technology (IT) Internet Protocol (IP) network, the method comprising:

advertising one or more network intentions of the building control device on the Information Technology (IT) Internet Protocol (IP) network;

establishing a secure OT virtual private network over the Information Technology (IT) Internet Protocol (IP) network based at least in part on one or more of the network intentions stored by the building control device, the network intentions provisions the building control device for secure communication over the secure OT virtual private network;

publishing outgoing building control information generated by the building control device and/or subscribing to incoming building control information for consumption by the building control device over the secure OT virtual private network established over the Information Technology (IT) Internet Protocol (IP) network;

receiving OT data from one or more OT building control components that are not provisioned for secure communication over the secure OT virtual private network;

translating the OT data, generated by one or more of the OT building control components that are not provisioned for secure communication over the secure OT virtual private network into a namespace convention of a message publisher-subscriber component of the building control device for publishing the OT data generated by the one or more of the OT building control components that are not provisioned for secure communication over the secure OT virtual private network onto the secure OT virtual private network that operates on the Information Technology (IT) Internet Protocol (IP) network; and supporting other IT network traffic over the Information Technology (IT) Internet Protocol (IP) network outside of the secure OT virtual private network including IT network traffic between one or more desktop computers, lap top computers, tablet computers, printers, wireless access points, routers and/or gateways.

14. The method of claim 13, wherein the outgoing building control information, once published, is published to a message broker that is on the secure OT virtual private network.

15. The method of claim 13, wherein the incoming building control information, once subscribed to, is received from a message broker that is on the secure OT virtual private network.

* * * * *